United States Patent [19]

Kirkby et al.

[11] Patent Number: 5,452,116
[45] Date of Patent: Sep. 19, 1995

[54] TRANSMISSION SYSTEMS INCORPORATING OPTICAL AMPLIFIERS

[75] Inventors: Paul A. Kirkby, Old Harlow; Richard E. Epworth, Sawbridgeworth, both of United Kingdom

[73] Assignee: Northern Telecom Limited, Montreal, Canada

[21] Appl. No.: 216,254

[22] Filed: Mar. 22, 1994

[30] Foreign Application Priority Data

Mar. 23, 1993 [GB] United Kingdom ............... 9305977

[51] Int. Cl.$^6$ .................... H04J 14/02; H04B 10/00
[52] U.S. Cl. ................... 359/124; 359/134; 359/160; 359/173; 359/341
[58] Field of Search .......... 359/114, 124, 126, 134, 359/153, 160–161, 173, 179, 341; 372/6; 385/122

[56] References Cited

U.S. PATENT DOCUMENTS

| | | | |
|---|---|---|---|
| 3,845,293 | 10/1974 | Borner | 250/199 |
| 5,035,481 | 7/1991 | Mollenauer | 359/124 |
| 5,276,543 | 1/1994 | Olshansky | 359/161 |
| 5,321,707 | 6/1994 | Huber | 372/6 |
| 5,331,449 | 7/1994 | Huber et al. | 359/160 |

OTHER PUBLICATIONS

Dragone "Integrated Optics N x N Multiplexers on Silicon", IEEE Photonics Technology Letters, vol. 3, No. 10, Oct., 1991, pp. 896–899.

*Primary Examiner*—Leo H. Boudreau
*Assistant Examiner*—Kinfe-Michael Negash
*Attorney, Agent, or Firm*—Lee, Mann, Smith, McWilliams, Sweeney & Ohlson

[57] ABSTRACT

In a wavelength multiplexed optical transmission system incorporating a concatenation of optical amplifiers the multiplexed signal passes through a limited number of amplifiers in which all channels are amplified together, after which, at the next amplifier, the signal is demultiplexed, each channel is separately amplified, and then the channels are remultiplexed.

5 Claims, 2 Drawing Sheets

TRANSMISSION SYSTEMS INCORPORATING OPTICAL AMPLIFIERS

BACKGROUND TO THE INVENTION

A single optical signal channel can be transmitted through a cascade of quite a number of optical amplifiers before it requires full regeneration. The spectral gain characteristic of a typical optical amplifier, such as an erbium doped fibre amplifier, is wide enough to support amplification of several wavelength multiplexed signal channels. However the spectral gain characteristic is not entirely uniform over its full usable spectral range. Thus an erbium doped fibre amplifier may show a significant peak in its gain characteristic near the short wavelength end of that characteristic. The use of filters to flatten such characteristics is known, but is still liable to leave the characteristic with residual undulations. Therefore, if a wavelength multiplexed set of signal channels is transmitted through a concatenation of such amplifiers, those channels registering with any slight troughs in the gain characteristic will not be amplified as much as other channels registering with any slight peaks. Quite a small difference in gain per amplifier can become quite significant in a long concatenation of amplifiers because the difference is multiplied by the number of amplifiers. Thus for instance if there is 0.5 dB difference in gain per amplifier between a channel at wavelength $\lambda_1$ and a channel at wavelength $\lambda_2$ then, if both channels were launched with equal power, after passage through a concatenation of 20 such amplifiers, those channels would differ in power by 10 dB, thereby bringing the weaker channel much closer to, or even beneath, the noise floor.

SUMMARY OF THE INVENTION

The present invention is directed to the achieving of a measure of gain compensation in a concatenation of amplifiers in order to ameliorate this problem. The invention also provides a convenient way of arranging for channel dropping and insertion at intermediate points in the concatenation, this being readily combinable with the gain compensation.

According to the present invention there is provided an optical transmission system for the transmission of a set of wavelength division multiplexed optical signal channels, said set consisting of a set of mutually exclusive subsets, each of at least one signal channel, which system includes a concatenation of optical amplifiers including, in the concatenation, together with a plurality of amplifiers in each of which amplification is performed in a transmission path that is common to all signal channels of the set, at least one other amplifier in which amplification is performed in a set of transmission paths, one assigned to each subset of signal channels.

The invention also provides an optical transmission system for the transmission of a set of wavelength division multiplexed optical signal channels, which system includes a concatenation of optical amplifiers including, in the concatenation, a plurality of amplifiers together with in each of which amplifiers amplification is performed in a transmission path that is common to all signal channels of the set, at least one drop and insertion amplifier in which the channels are demultiplexed, the signal in at least one channel of the set is dropped and a different signal inserted in its place, and in which drop and insertion amplifier the remaining channels of the set are separately amplified and then remultiplexed with said at least one inserted signal bearing channel.

The system's use of an optically pumped amplifier in which amplification is performed in a of set transmission paths, one assigned to each subset of the signal channels, can be implemented in a manner in which the power output from a single optical pump, or group of such pumps, can be conveniently shared between all members of the set of transmission paths thereby ensuring substantial equality of pumping. Hence, according to a third aspect of the present invention there is provided an optical transmission system for the transmission of a set of wavelength division multiplexed optical signal channels, said set consisting of a set of mutually exclusive subsets, each of at least one signal channel, which system includes a concatenation of optical amplifiers including in the concatenation at least one optical amplifier in which amplification is performed in a set of optically pumped amplifying transmission paths, one assigned to each subset of the signal channels, in which said at least one amplifier the wavelength division multiplexed signal is divided into physically separated channels by a demultiplexer, said physically separated channels being individually coupled with different members of said set of transmission paths, wherein said demultiplexer includes an input waveguide optically coupled with each member of a first set of waveguides of different optical path length, wherein each member of said first set is itself optically coupled with each member of a second set of waveguides individually optically coupled with different members of said set of optically pumped amplifying transmission paths, and wherein optical pump power for all members of the set of optically pumped amplifying transmission paths is provided by way of an additional waveguide optically coupled with each member of the second set of waveguides.

BRIEF DESCRIPTION OF THE DRAWINGS

There follows a description of an optical transmission systems embodying the invention in preferred forms. The description refers to the accompanying drawings, in which.

DETAILED DESCRIPTION OF PREFERRED EMBODIMENTS

Figure 1:
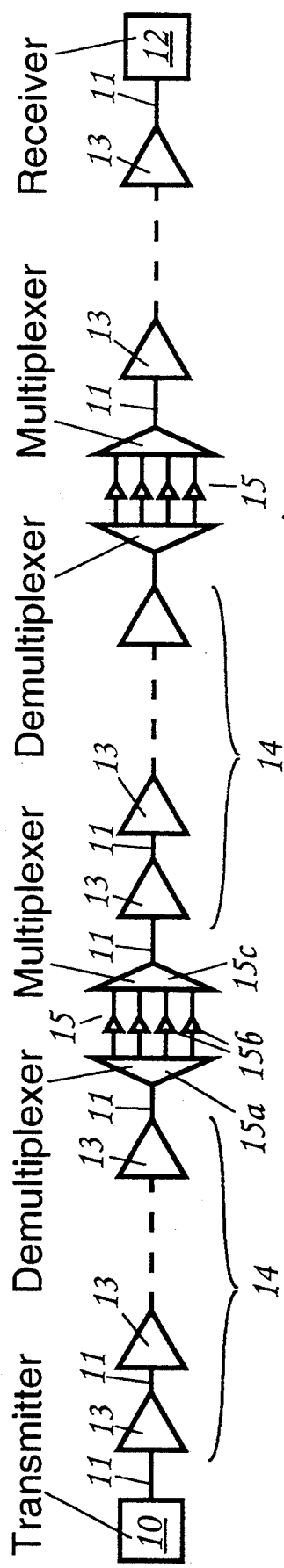
FIG. 1 is a block diagram of a wavelength division multiplexed optical transmission system incorporating a concatenation of optical amplifiers comprising a number of channel separated optical amplifiers interleaved between a larger number of common channel amplifiers.

The wavelength division multiplexed optical transmission system of FIG. 1 has a transmitter 10 transmitting a set of wavelength multiplexed optical signal on a single optical fibre transmission path 11 to a receiver 12. In this transmission path is inserted a concatenation of n.m common-channel optical amplifiers 13, for instance erbium doped optical fibre or integrated optics format amplifiers. These amplifiers, which are operated under saturation conditions, are separated into short sequences 14 by the interleaving of individual members of a set of (m-1) channel-separated optical amplifiers 15 which divide the common channel amplifiers into m sequences 14, each comprising an uninterrupted sequence of n common-channel amplifiers. By way of example there may be twenty common-channel amplifiers per sequence, the actual number being determined principally in relation to the limits placed upon an individual common-channel amplifier concerning the flatness of its amplification characteristic over the whole waveband of the wavelength division multiplexed signal transmitted along the transmission path 11.

In each common-channel amplifier the incoming signal is amplified without being divided into its component channels for that amplification. The transmitter 10 is arranged to provide substantially equal power output into each one of the channels. If, as a result of the lack of flatness in its amplification characteristic, the first common-channel amplifier after the transmitter provides x dB less amplification for the channel it amplifies least in comparison with the amplification it provides for the channel it amplifies most, then, assuming no differential attenuation in the transmission path 11, by the time the signal has passed through the interrupted sequence of n common-channel amplifiers, all having identical amplification characteristics, the signal strength of the least amplified channel will be n.x dB less than that of the most amplified channel. After the nth common-channel amplifier, the last one in the sequence, the next amplification stage takes place in a channel-separated amplifier 15.

In a channel-separated amplifier the incoming signal is first separated into its individual channels by a wavelength demultiplexer 15a. Each one of these separated channels is separately amplified in an associated one of a set of amplifiers 15b, and then all the channels are recombined in a wavelength multiplexer 15c for onward transmission. In instances where the set of channels may be grouped into subsets of channels for which the individual channel spacing between all the members of each subset is so close that any differential amplification is negligible, then, instead of dividing this incoming signal into individual channels for separate amplification, it may be beneficial to divide it into mutually exclusive sub groups of channels, where one or more subsets comprise two or more closely wavelength spaced channels.

Figure 2:
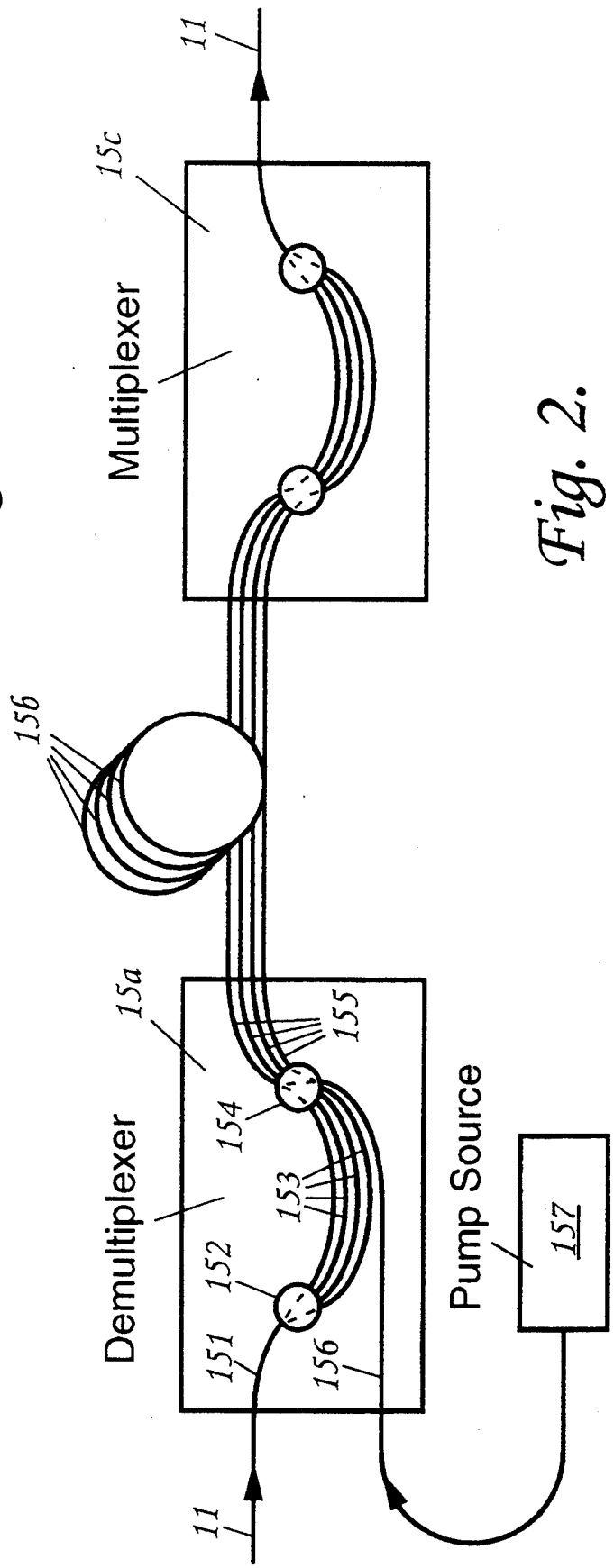
FIG. 2 is a diagram of one of the channel separated optical amplifiers of the system of FIG. 1.

The form of channel-separated amplifier 15 depicted in FIG. 2 uses, by way of example, integrated optics format wavelength multiplexers and demultiplexers that employ radiative stars interconnected by arrayed waveguide gratings. The general principles of operation of such coupled radiative stars are described for instance by C. Dragone et al., 'Integrated Optics N×N Multiplexer on Silicon'. IEEE Photonics Technology Letters, Vol. 3, No. 10, October 1991, pages 896–9. In the integrated optics multiplexer 15a, the multiplexed signal input from transmission line 11 is coupled into a single input waveguide 151, which is a conventional 2-dimensional waveguide terminating at its other end in a planar (1-dimensional) waveguide region 152 within which the signal power fans out laterally. At the far side of this planar waveguide region 152, the light is intercepted by an array of 2-dimensional waveguides 153. These waveguides 153 are shaped to provide the same incremental optical path length difference between each pair of adjacent waveguides in the array. By this means there is produced a wavelength dependent phase shift at their far ends. From these far ends, the light is launched into a second planar waveguide region 154. As the result of the wavelength dependent phase shift, the propagation direction of the converging wave in this second planar waveguide region is wavelength dependent, and hence the different channels are laterally separated at the far side of this second planar waveguide region, where they are launched into laterally separated 2-dimensional waveguides 155. Each of the waveguides 155 is coupled to an associated one of a set of individual fibre amplifiers 15b and, at the far end of these fibre amplifiers, the separated channels are recombined in the multiplexer 15c which may be identical in construction to the demultiplex 151z, but connected the other way round. Conveniently, but not necessarily, the individual amplifiers 15b may all be pumped from a common source. The demultiplexer 151a of FIG. 2 includes an additional 2-dimensional waveguide 156, one end of which is optically coupled with a pump laser 157, while the other end terminates in the second planar waveguide region 154 so that the pump power from the laser 157 fans out to illuminate the ends of all the 2-dimensional waveguides 155. As specifically illustrated in FIG. 2 the separated-channel amplifier is co-pumped. Connecting it the other way round, it would be counter-pumped. Alternatively both integrated circuits can be provided with waveguides 156 and associated pump lasers 157 so as to provide amplifiers which are bi-directionally pumped.

The pumping of the separated channel amplifier 15 is arranged so that each of its individual amplifiers 15b operated as a saturating amplifier. Thus the differences in signal power between the various channels at the input to the separated channel amplifier are substantially ironed out by it, so that at its output the power in each channel is substantially equalised. Accordingly the emergent signal can be amplified by a further sequence of n common channel amplifiers before once again it becomes desirable to employ a separated channel amplifier.

Figure 3:
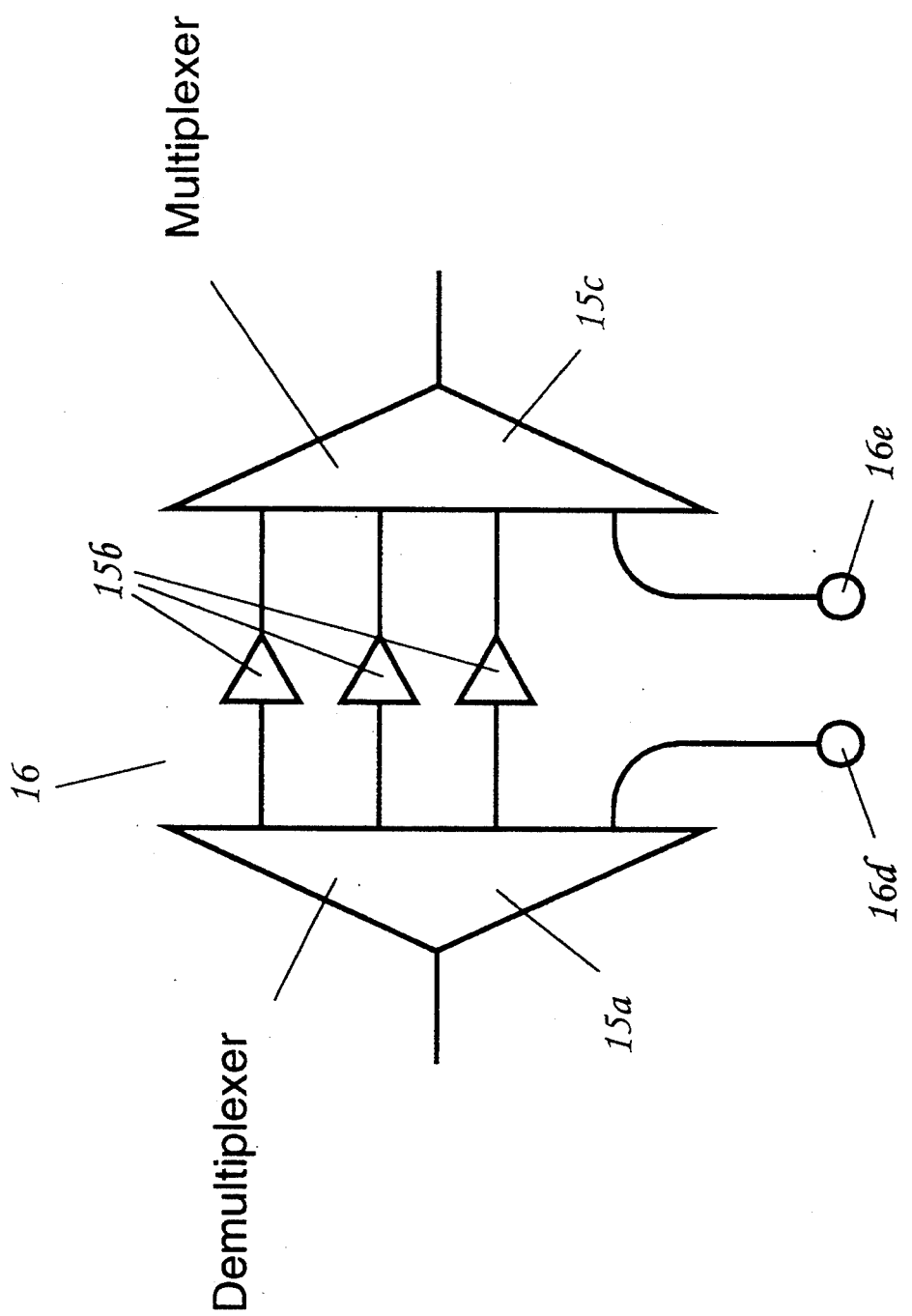
FIG. 3 is a diagram of a drop and insert amplifier.

In a modification of FIG. 1, one or more of the separated channel amplifiers 15 may be replaced on an individual basis by a drop and insert amplifier 16. Such a drop and insert amplifier 16 is a special form of channel separated amplifier and, like the channel separated amplifiers of FIG. 1 and 2, has a demultiplexer 15a, a set of amplifiers 15b, and a multiplexer 15c. It is only the interconnections that are different. In the channel separated amplifiers of FIGS. 1 and 2 every one of the demultiplexed channels output by the demultiplexer 15a is fed via its associated amplifier 15b direct to the multiplexer 15c; whereas in the case of the drop and insert amplifier 16 of FIG. 3 at least one of the demultiplexed channels output by the demultiplexer is instead fed to an output port 16d associated with that particular channel, while an input port 16e provides, for a different signal on this channel, one of the inputs to the demultiplexer 15c. In this drop and insert amplifier 16 the dropped channel appearing at output port 16d is an amplified output if the demultiplexer is of the construction specifically illustrated in FIG. 2 that has the one pump source 157 arranged as a common pump for all channels. Similarly the insert signal applied to the input port 16e will be amplified if the multiplexer 15c is of the type arranged for common counter-pumping.

We claim:

1. An optical transmission system for the transmission, from an optical transmitter along an optical highway that includes a concatenation of optical amplifiers to an optical receiver, of a set of wavelength division multiplexed optical signal channels, said set consisting of a set of mutually exclusive subsets, each of at least one signal channel, which concatenation of optical amplifiers includes a plurality of common-channel optical amplifiers and at least one channel-separated optical amplifier, wherein each common-channel optical amplifier has an optically amplifying transmission path that is common to all signal channels of the set, and wherein said at least one channel-separated optical amplifier includes a wavelength demultiplexer optically coupled with a wavelength multiplexer via a set of physically separated optically amplifying transmission paths optically in parallel each transmitting and amplifying a different one of said subsets of channels.

2. An optical transmission system as claimed in claim 1, wherein each subset of channels consists of a single optical signal channel.

3. An optical transmission system that includes an optical highway for the transmission of a set of wavelength multiplexed signal channels, which highway extends from an optical transmitter to an optical receiver and includes a concatenation of optical amplifiers, which concatenation of optical amplifiers includes a plurality of common-channel optical amplifiers and at least one drop and insertion optical amplifier, wherein each common channel optical amplifier has an optically amplifying transmission path that is common to all signal channels of the set, and wherein said at least one drop and insertion optical amplifier includes a wavelength demultiplexer optically coupled with a wavelength multiplexer via a set of physically separated optically amplifying transmission paths optically in parallel each transmitting a different one of said subset of channels, the wavelength demultiplexer additionally having an optical output optically coupled with an intermediate receiver, and the wavelength multiplexer additionally having an optical input optically coupled with an intermediate transmitter, whereby a signal on one channel of the set of channels is dropped from the highway and its place taken by the insertion of another signal on that channel.

4. An optical transmission system for the transmission, from an optical transmitter along an optical highway that includes a concatenation of optical amplifiers to an optical receiver, of a set of wavelength division multiplexed optical signal channels, said set consisting of a set of mutually exclusive subsets, each of at least one signal channel, which concatenation of optical amplifiers includes a plurality of common-channel optical amplifiers and at least one channel-separated optical amplifier, wherein each common-channel optical amplifier has an optically amplifying transmission path that is common to all signal channels of the set, and wherein said at least one channel-separated optical amplifier includes a wavelength demultiplexer optically coupled with a wavelength multiplexer via a set of physically separated optically amplifying transmission paths optically in parallel each transmitting and amplifying a different one of said subsets of channels, wherein said demultiplexer includes an input waveguide optically coupled with each member of a first set of waveguides of different optical path length, wherein each member of said first set is itself optically coupled with each member of a second set of waveguides individually optically coupled with different members of said set of optically pumped amplifying transmission paths, and wherein optical pump power for all members of the set of optically pumped amplifying transmission paths is provided by way of an additional waveguide optically coupled with each member of the second set of waveguides.

5. An optical transmission system as claimed in claim 4, wherein each subset consists of a single optical signal channel.

* * * * *